US006772690B2

(12) United States Patent
Inoue

(10) Patent No.: US 6,772,690 B2
(45) Date of Patent: Aug. 10, 2004

(54) METHOD OF AND DEVICE FOR DETECTING AMOUNT OF INK IN INK FOUNTAIN

(75) Inventor: Hideaki Inoue, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 10/184,887

(22) Filed: Jul. 1, 2002

(65) Prior Publication Data

US 2003/0000397 A1 Jan. 2, 2003

(30) Foreign Application Priority Data

Jul. 2, 2001 (JP) ....................................... 2001-200918

(51) Int. Cl.[7] .......................... B41F 31/02; B41F 33/00; G05D 9/00

(52) U.S. Cl. ....................... 101/484; 101/491; 101/364; 101/119

(58) Field of Search ........................... 73/304 R, 304 C, 73/290 R; 101/116, 119, 120, 349.1, 363, 364, 484, 491; 137/386; 347/7; 118/694

(56) References Cited

U.S. PATENT DOCUMENTS 5,103,728 A * 4/1992 Barney ....................... 101/364
5,699,731 A * 12/1997 Hara .......................... 101/119
5,898,308 A * 4/1999 Champion .................. 324/643
6,530,519 B1 3/2003 Suzuki

FOREIGN PATENT DOCUMENTS

JP 58-062520 A 4/1983
JP 60-193687 A 10/1985
JP 2001-18507 1/2001

* cited by examiner

*Primary Examiner*—Leslie J. Evanisko
(74) *Attorney, Agent, or Firm*—Donald R. Studebaker; Nixon Peabody LLP

(57) ABSTRACT

The amount of ink in an ink fountain in a printer is detected on the basis of change of oscillation. The oscillation frequency is changed on the basis of dielectric constant information on the dielectric constant of the ink.

3 Claims, 6 Drawing Sheets

METHOD OF AND DEVICE FOR DETECTING AMOUNT OF INK IN INK FOUNTAIN

BACKGROUND OF THE INVENTION

1. Field of the Invention

This invention relates to a method of and a device for detecting the amount of ink in the ink fountain in a printer such as a stencil printer, and more particularly to such a method and a device in which the amount of ink is detected on the basis of the oscillation frequency.

2. Description of the Related Art

There has been known a printer such as a stencil printer in which ink is supplied to an ink fountain in a printing drum by an ink pump from an exchangeable ink container. In such a printer, the amount of ink in the ink fountain is detected by an ink sensor and when the ink in the ink fountain is consumed to a predetermined amount, the ink pump is operated to replenish the ink fountain with the ink from the ink container in order to keep constant the amount of ink in the ink fountain. (See, for instance, Japanese Unexamined Patent Publication No. 60(1985)-193687)

As a method of detecting the amount of ink, there has been proposed a method in which the tip of a needle antenna connected to an oscillator is dipped in the ink and the amount of the ink is detected on the basis of the oscillation frequency of the oscillator which varies with the depth to which the antenna is dipped in the ink. (See, for instance, Japanese Unexamined Patent Publication No. 58(1983)-62520) With this method, since as the depth to which the antenna is dipped in the ink increases, the electrostatic capacity around the antenna increases and the oscillation frequency of the oscillator lowers, the amount of ink in the ink fountain can be kept constant by replenishing the ink fountain with the ink so that the oscillation frequency detected becomes constant.

However, the oscillation frequency also depends upon the dielectric constant of the ink, and when the ink is small in dielectric constant, change of the oscillation frequency is small, which makes it difficult to detect change of the oscillation frequency with change of the amount of ink in the ink fountain. To the contrast, when the ink is large in dielectric constant, unnecessary radiation increases and the accuracy in detecting the change of the oscillation frequency is deteriorated. When detection of change of the oscillation frequency with change of the amount of ink in the ink fountain is difficult or the accuracy in detecting the change of the oscillation frequency is deteriorated, it becomes impossible to keep constant the amount of ink in the ink fountain and as a result, quality of the printed image deteriorates.

SUMMARY OF THE INVENTION

In view of the foregoing observations and description, the primary object of the present invention is to provide a method of and a device for detecting the amount of ink which can properly detect change of the oscillation frequency irrespective of the dielectric constant of the ink.

In accordance with a first aspect of the present invention, there is provided a method of detecting the amount of ink in an ink fountain in a printer on the basis of change of oscillation frequency wherein the improvement comprises the step of changing the oscillation frequency on the basis of dielectric constant information on the dielectric constant of the ink.

The dielectric constant information may represent the dielectric constant of the ink itself, or may represent other factors such as the viscosity of the ink, the color of the ink, the time for which the ink is left to stand and the date of production of the ink on the basis of which the dielectric constant of the ink can be calculated.

The dielectric constant information may be obtained by measuring the dielectric constant of the ink or may be obtained from an information storage means attached to the ink bottle for supplying ink to the ink fountain.

As the information storage means, for instance, a non-volatile memory (e.g., an EEPROM) which can hold data for a predetermined time interval without supplying power. This applicant has proposed a system for variously controlling a printer on the basis of information stored in such an information storage means attached to consumables like an ink bottle. See Japanese Unexamined Patent Publication No. 2001-18507.

Further the dielectric constant information may be input through an input means.

In accordance with a second aspect of the present invention, there is provided a device for detecting the amount of ink in an ink fountain in a printer on the basis of change of oscillation frequency wherein the improvement comprises a frequency changing means which changes the oscillation frequency on the basis of dielectric constant information on the dielectric constant of the ink.

The frequency changing means may be arranged to obtain the dielectric constant information by measuring the dielectric constant of the ink and to change the oscillation frequency on the basis of the dielectric constant information thus obtained.

Further, the frequency changing means may be arranged to change the oscillation frequency on the basis of dielectric constant information provided from an information storage means attached to the ink bottle for supplying ink to the ink fountain.

The device may further comprises an input means so that the frequency changing means changes the oscillation frequency on the basis of the dielectric constant information input through the input means.

In accordance with the present invention, since the oscillation frequency is changed on the basis of the dielectric constant information, the change of the oscillation frequency can be easily detected by increasing the oscillation frequency when the ink is small in dielectric constant and, unnecessary radiation can be suppressed and the accuracy in detecting the change of the oscillation frequency can be improved by decreasing the oscillation frequency when the ink is large in dielectric constant, whereby change of the oscillation frequency can be accurately detected and the amount of ink in the ink fountain can be accurately detected irrespective of the dielectric constant of the ink, which makes it feasible to keep constant the amount of ink in the ink fountain and to obtain high quality images.

DESCRIPTION OF THE PREFERRED EMBODIMENTS

Figure 1:
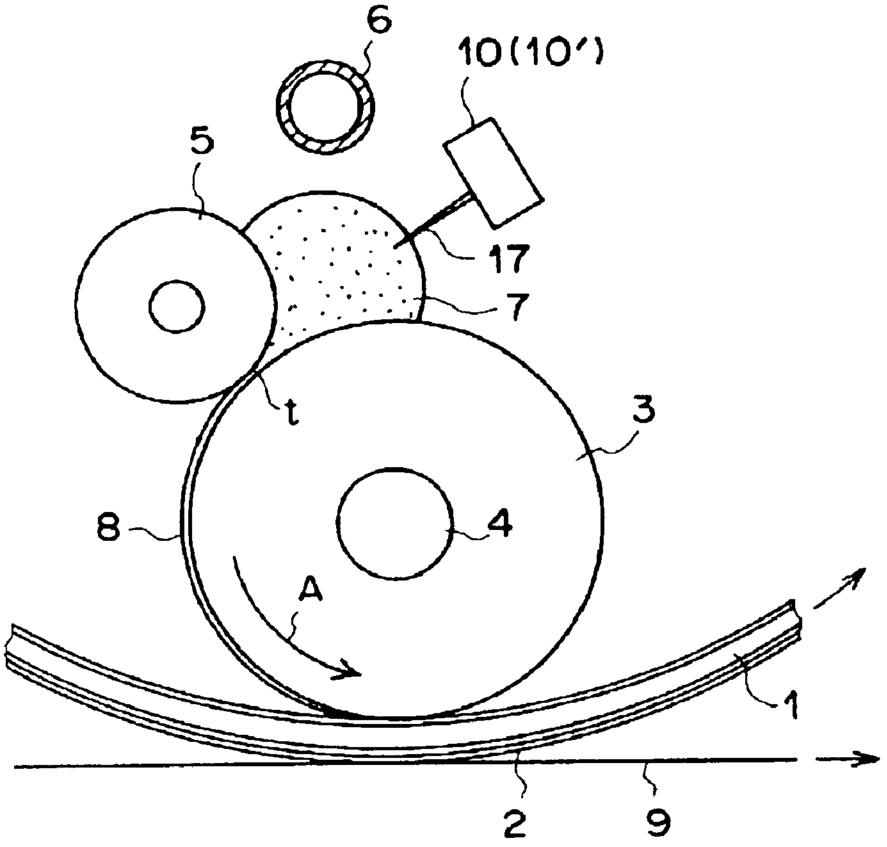
FIG. 1 is a schematic view showing an important part of a stencil printer employing an ink amount detecting device for detecting the amount of ink in accordance with a first embodiment of the present invention.

In FIG. 1, a stencil printer comprises a printing drum 1 around which a master 2 is wound. An ink coater roller 3 is disposed inside the printing drum 1 to rotate about a rotary shaft 4 in the direction of arrow A in contact with the inner peripheral surface of the printing drum 1, thereby supplying ink to the printing drum 1. A doctor roller 5 is disposed in the vicinity of the ink coater roller 3 to control the amount of ink supplied to the outer peripheral surface of the ink coater roller 3. The doctor roller 5 is provided with respect to the ink coater roller 3 with a space t intervening therebetween. An ink fountain 7 is formed at the contact area of the ink coater roller 3 and the doctor roller 5. An ink supply mechanism 6 supplies ink to the ink fountain 7 by a ink supply pump (not shown).

When passing through the space t between the ink coater roller 3 and the doctor roller 5 in response to rotation of the ink coater roller 3, the ink in the ink fountain 7 adheres to the outer peripheral surface of the ink coater roller 3 to form an ink layer 8 of a uniform thickness. As the ink coater roller 3 rotates, the ink layer 8 is conveyed to the contact area of the ink coater roller 3 and the printing drum 1 and transferred to the inner peripheral surface of the printing drum 1. Further, the ink transferred to the inner peripheral surface of the printing drum 1 passes through the printing drum 1 under the pressure of the ink coater roller 3 and is transferred to a printing paper 9 through the master 2.

Figure 2:
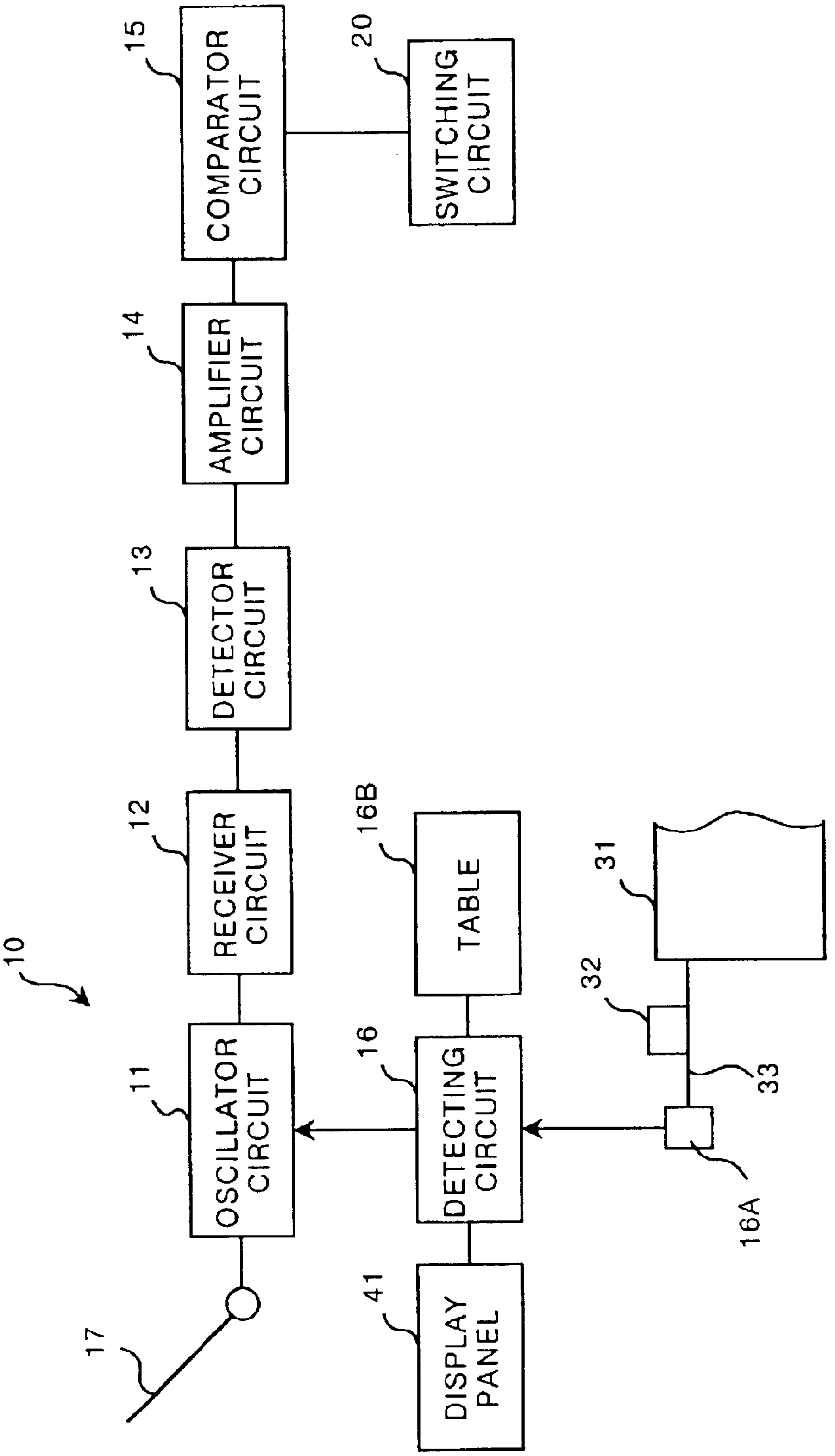
FIG. 2 is a block diagram showing the structure of the ink amount detecting device of the first embodiment.

The amount of ink in the ink fountain 7 is detected by an ink amount detecting device 10 in accordance with a first embodiment of the present invention. As shown in FIG. 2, the ink amount detecting device 10 comprises an oscillator circuit 11, a receiver circuit 12, a detector circuit 13, an amplifier circuit 14, a comparator circuit 15, a detecting circuit 16 and an antenna 17.

Figure 3:
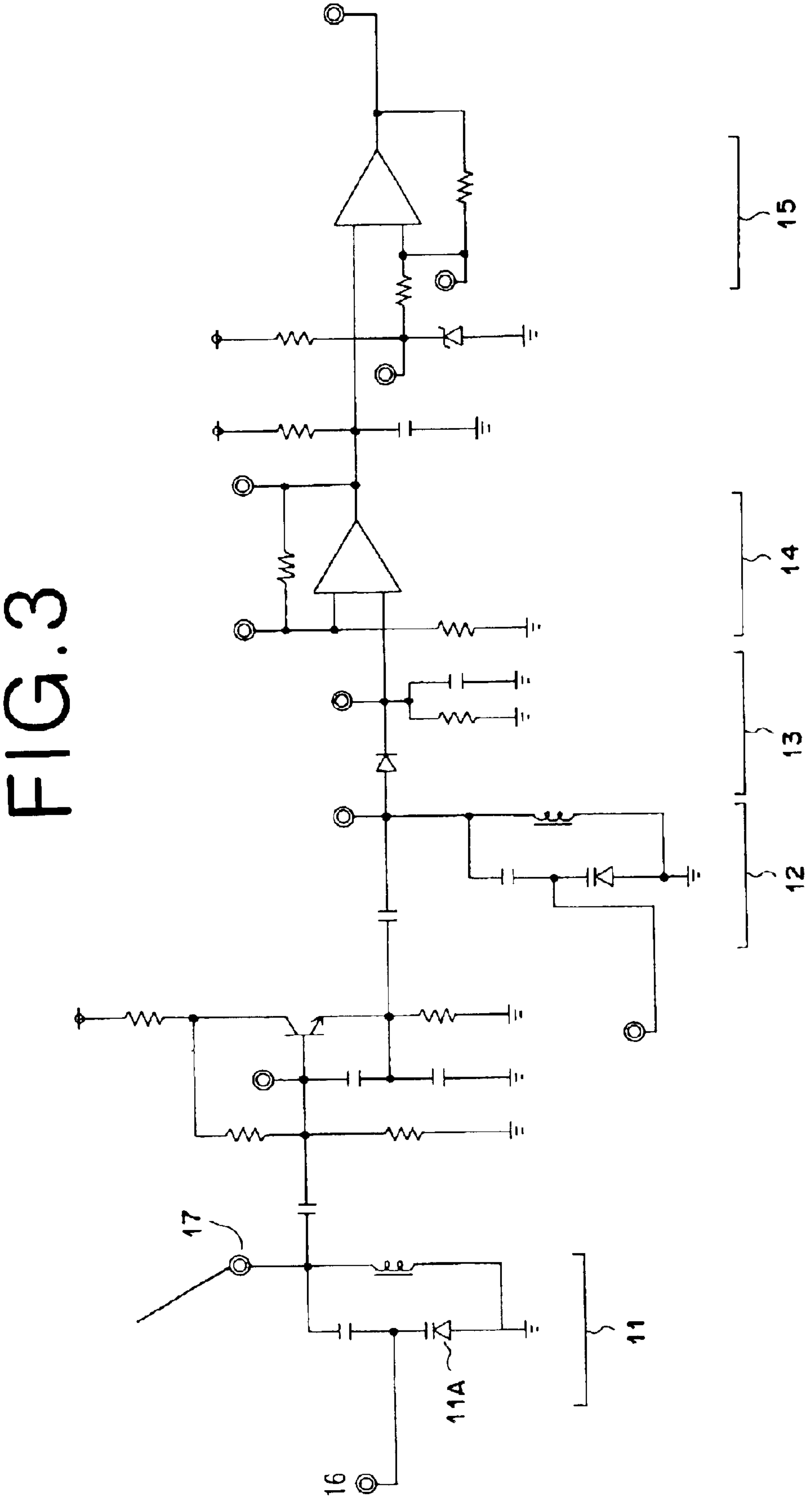
FIG. 3 is a circuit diagram showing a specific circuit of the ink amount detecting device of the first embodiment.

With reference to also FIG. 3, the oscillator circuit 11 is an LC resonance circuit having a winding and a capacitor and the oscillation frequency from the antenna 17 can be controlled by changing the bias of a variable capacitance diode 11A. The control signal for changing the bias of the variable capacitance diode 11A is input from the detecting circuit 16.

The receiver circuit 12 is a kind of tuning circuit and generates a harmonic signal when it receives a signal of a particular frequency and is tuned.

Since ink is larger than air in dielectric constant, the electrostatic capacity of the capacitor of the oscillator circuit 11 increases as the amount of ink in the ink fountain 7 increases, and vice versa. Accordingly, in order to keep the amount of ink in the ink fountain 7 constant at a predetermined amount, the bias of the variable capacitance diode 11A of the oscillator circuit 11 is controlled so that a signal of a frequency corresponding to the predetermined amount is oscillated, and the receiver circuit 12 is set to be tuned to the frequency of the oscillator circuit 11.

The detector circuit 13 converts the frequency signal generated by the receiver circuit 12 to a DC voltage.

The amplifier circuit 14 amplifies the DC voltage output from the detector circuit 13.

The comparator circuit 15 compares the value of the signal output from the amplifier circuit 14 with a reference value. When the value of the signal output from the amplifier circuit 14 is not smaller than the reference value, the comparator circuit 15 generates an ON-signal to turn on a switching circuit 20. Whereas when the value of the signal output from the amplifier circuit 14 is smaller than the reference value, the comparator circuit 15 generates an OFF-signal to turn off the switching circuit 20. The switching circuit 20 is for controlling the ink supply pump (not shown) and only when the switching circuit 20 is on, the ink supply pump supplies ink to the ink fountain 7.

The detecting circuit 16 reads out information representing the kind of ink stored in a memory 32 attached to the ink bottle 31, and generates a control signal for setting the bias of the variable capacitance diode 11A of the oscillator circuit 11 with reference to a table 16B (FIG. 2) representing the relation between the kind of the ink and the bias of the variable capacitance diode 11A (based on the dielectric constant according to the kind of ink). Bias of the variable capacitance diode 11A to cause the oscillator circuit 11 to oscillate at a frequency optimal to the dielectric constant of the ink is calculated in advance for each of a plurality of kinds of ink and the kind of ink is related to the calculated bias in the table 16B.

The detecting circuit 16 is provided with a connector 16A which is connected to a circuit board 33 on which the memory 32 is mounted and reads out the kind of the ink stored in the memory 32. When the ink bottle 31 is set in the stencil printer and the circuit board 33 is connected to the connector 16A, the kind of the ink stored in the memory 32 is readout. The detecting circuit 16 is also connected to a display panel 41 and determination in processing performed by the detecting circuit 16 is displayed on the display panel 41.

Figure 4:
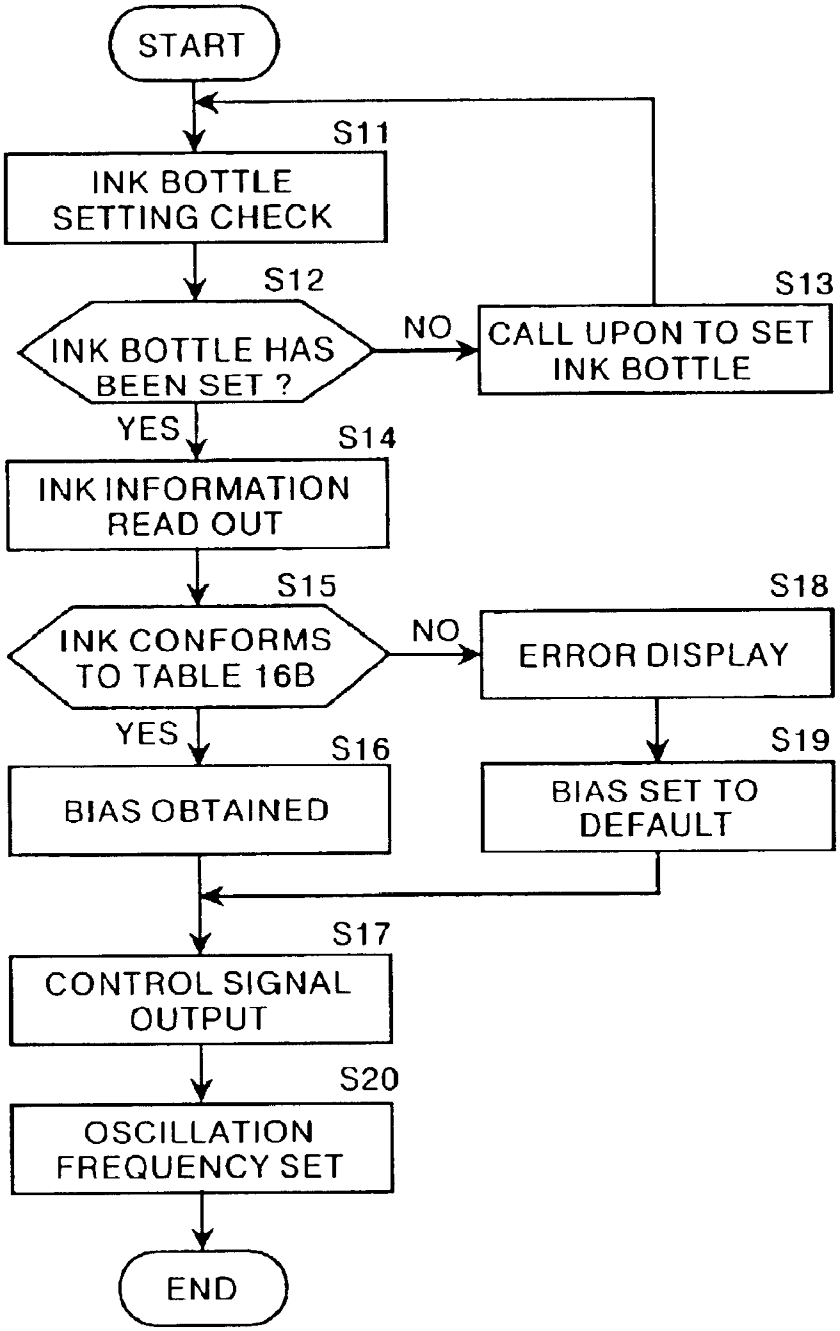
FIG. 4 is a flow chart for illustrating operation of the ink amount detecting device of the first embodiment.

Operation of the stencil printer will be described, hereinbelow. FIG. 4 shows the processing to be performed by the detecting circuit 16. The detecting circuit first determines whether an ink bottle 31 has been set in the stencil printer. (steps S11 and S12) When it is determined in step S12 that an ink bottle 31 has been set in the stencil printer, the detecting circuit 16 reads out ink information representing the kind of the ink in the ink bottle 31 from a memory 32 attached to the ink bottle 31. (step S14) When it is determined in step S12 that an ink bottle 31 has not been set in the stencil printer, a display to call upon the operator to set an ink bottle 31 is made on the display panel 41. (step S13) Steps S11 to S13 are repeated until an ink bottle 31 is set.

After reading out the ink information, the detecting circuit 16 refers to the table 16B and determines whether the kind of the ink read out is in the table 16B. (step S15) When it is determined in step S15 that the kind of the ink read out is in the table 16B, the detecting circuit 16 gets bias of the variable capacitance diode 11A corresponding to the kind of the ink from the table 16B (step S16), and outputs a control signal corresponding to the bias to the oscillator circuit 11 (step S17). Whereas when it is determined in step S15 that the kind of the ink read out is not in the table 16B, an error message such as "The kind of ink is not good" is displayed on the display panel 41 (step S18) and the bias is set to a default value (step S19). Thereafter, the detecting circuit 16 proceeds to step S17. Then the oscillator circuit 11 sets the oscillation frequency according to the bias represented by the control signal. (step S20)

The oscillator circuit 11 oscillates at an oscillation frequency thus set. When ink exists in the ink fountain 7 and the tip of the antenna 17 is in contact with the ink, the dielectric constant of the ink increases the electrostatic capacity and the oscillation frequency at which the oscillator circuit 11 actually oscillates becomes lower than the oscillation frequency set by the control signal from the detecting circuit 16. At this time, since the receiver circuit 12 is not tuned to the oscillation frequency of the oscillator circuit 11, the output voltage from the receiver circuit 12 becomes lower than when the receiver circuit 12 is tuned to the oscillation frequency of the oscillator circuit 11. Accordingly, the value of the signal output from the amplifier circuit 14 is smaller than the reference value and the comparator circuit 15 generates an off signal, whereby the switching circuit 20 is turned off. In this state, the ink supply pump is not operated and no ink is supplied to the ink fountain 7.

To the contrast, when the ink in the ink fountain 7 is consumed and the tip of the antenna 17 comes to be away from the ink, the oscillator circuit 11 oscillates at the oscillation frequency set by the control signal from the detecting circuit 16. At this time, the receiver circuit 12 is tuned to the oscillation frequency of the oscillator circuit 11 and outputs a harmonic signal at a high voltage. Accordingly, the value of the signal output from the amplifier circuit 14 is not smaller than the reference value and the comparator circuit 15 generates an on signal, whereby the switching circuit 20 is turned on. In this state, the ink supply pump is operated and ink is supplied to the ink fountain 7 from the ink bottle 31.

Then, when the amount of ink in the fountain 7 is increased and the antenna 17 is brought into contact with the ink again, the ink pump is stopped, whereby the amount of ink in the ink fountain 7 is kept constant during printing.

In the stencil printer, since the oscillation frequency of the oscillator circuit 11 is changed according to the kind of the ink or the dielectric constant of the ink, the change of the oscillation frequency can be easily detected by increasing the oscillation frequency when the ink is small in dielectric constant and, unnecessary radiation can be suppressed and the accuracy in detecting the change of the oscillation frequency can be improved by decreasing the oscillation frequency when the ink is large in dielectric constant. Accordingly, change of the oscillation frequency can be accurately detected and the amount of ink in the ink fountain can be accurately detected irrespective of the dielectric constant of the ink, which makes it feasible to keep constant the amount of ink in the ink fountain 7 and to obtain high quality images.

Though, in the first embodiment described above, the table 16B represents the relation between the kind of ink and the bias of the variable capacitance diode 11A, the table 16B may be arranged to represent the relation between the dielectric constant of ink and the bias of the variable capacitance diode 11A when the ink information stored in the memory 32 represents the dielectric constant of the ink. Further, when the ink information stored in the memory 32 represents another factor such as the viscosity of the ink, the color of the ink, the time for which the ink is left to stand or the date of production of the ink which can affect the dielectric constant of the ink, the table 16B may be arranged to represent the relation between such a factor and the bias of the variable capacitance diode 11A.

Figure 5:
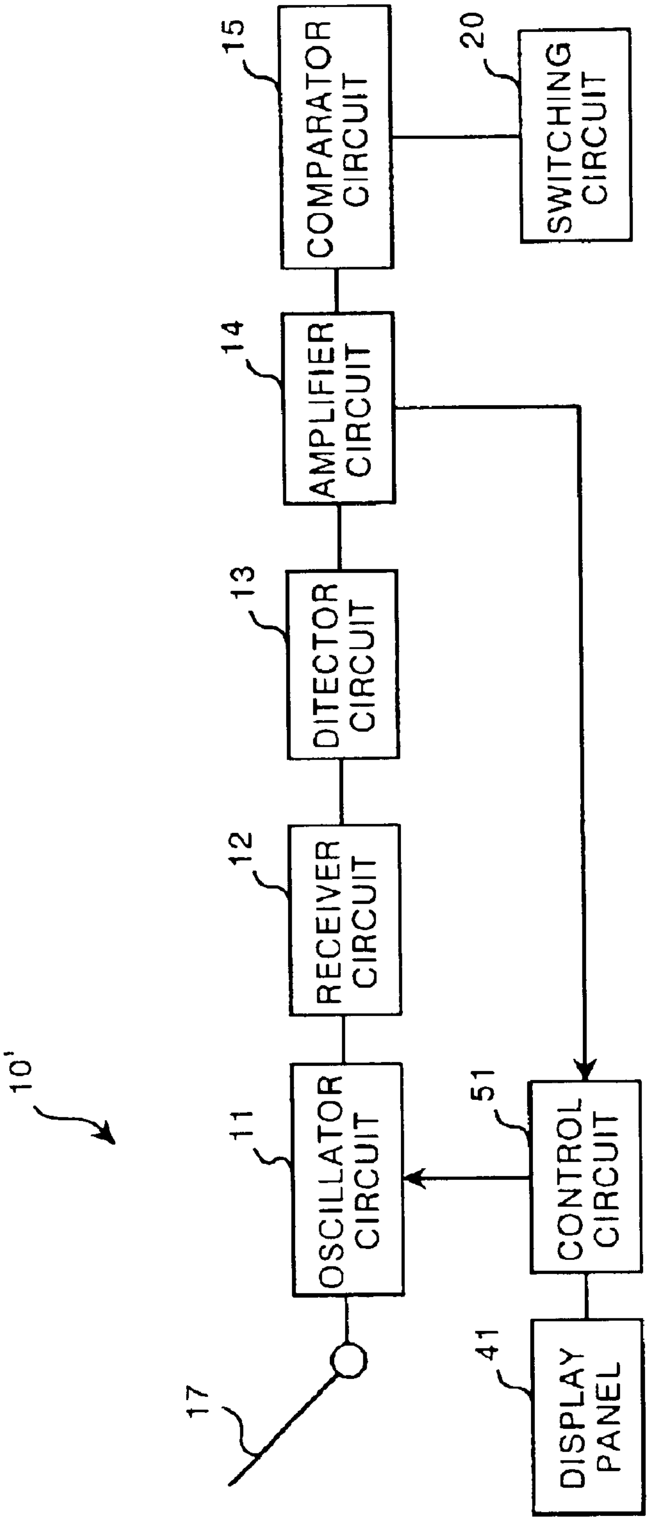
FIG. 5 is a block diagram showing the structure of an ink amount detecting device in accordance with a second embodiment of the present invention.

FIG. 5 is a block diagram showing the structure of an ink amount detecting device 10' in accordance with a second embodiment of the present invention. The ink amount detecting device 10' of this embodiment differs from the ink amount detecting device 10 of the first embodiment in that a control circuit 51 which measures the dielectric constant of the ink and outputs a control signal for changing the oscillation frequency of the oscillator circuit 11 according to the measured dielectric constant of the ink is provided in place of the detecting circuit 16.

The control circuit 51 outputs a control signal which sets the bias of the variable capacitance diode 11A of the oscillator circuit 11 so that the value of the signal output from the amplifier circuit 14 becomes equal to a reference value and the oscillator circuit 11 oscillates at the frequency at which the value of the signal output from the amplifier circuit 14 becomes equal to the reference value. Since the output signal of the amplifier circuit 14 is an analog signal, the control circuit 51 is provided with an A/D convertor.

Figure 6:
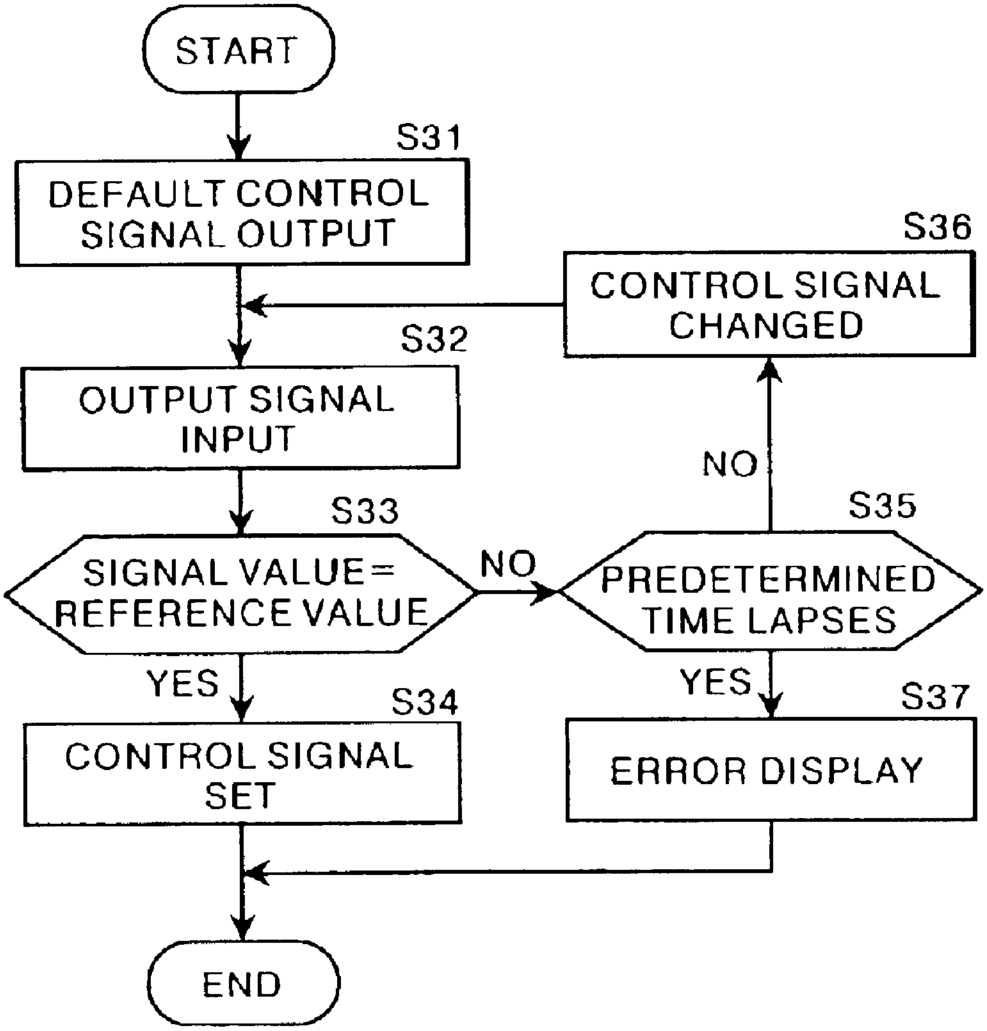
FIG. 6 is a flow chart for illustrating operation of the ink amount detecting device of the second embodiment.

Operation of the second embodiment will be described with reference to the flow chart shown in FIG. 6, hereinbelow. In the second embodiment, the depth to which the antenna 17 is dipped in the ink fountain 7 is set to a predetermined default value. A control signal for setting the bias of the variable capacitance diode 11A of the oscillator circuit 11 to an initial value is first output to the oscillator circuit 11. (step S31) This causes the oscillator circuit 11 to oscillate at the default oscillation frequency, whereby the receiver circuit 12 outputs an output signal and the amplifier circuit 14 amplifies the output signal and inputs the amplified output signal into the control circuit 51. (step S32) Then whether the output signal is equal to the reference value is determined. (step S33) When it is determined in step S33 that the output signal is equal to the reference value, the control signal is set to provide the bias at that time. (step S34) Otherwise, the control signal is changed to change the bias of the variable capacitance diode 11A of the oscillator circuit 11 (step S36) and then step S32 and S33 are repeated until the output signal becomes equal to the reference value. Steps S36, S32 and S33 are repeated until the output signal becomes equal to the reference value in a predetermined time interval (step S35). When the output signal does not become equal to the reference value in the predetermined time interval (step S35). an error message to the effect that it is impossible to detect the amount of ink is displayed on the display panel 41 (step S37).

Though the oscillation frequency of the oscillator circuit 11 is changed by setting the bias of the variable capacitance diode 11A of the oscillator circuit 11 by the detecting circuit 16 in the first embodiment and by the control circuit 51 in the second embodiment, the oscillation frequency may be changed by manually inputting a desired oscillation frequency through a keyboard or a control panel.

What is claimed is:

1. A method of detecting an amount of ink in an ink fountain of a printer, comprising:

determining the amount of ink in the ink fountain based on a change of oscillation frequency of an oscillator coupled to an antenna dipped in the ink fountain;

obtaining dielectric constant information associated with the type of ink in the ink fountain; and applying a bias to the oscillator based on the obtained dielectric constant information, wherein the dielectric constant information is obtained by measuring the dielectric constant of the ink.

2. A device for detecting an amount of ink in an ink fountain of a printer, comprising:

means for determining the amount of ink in the ink fountain based on a change of oscillation frequency of an oscillator coupled to an antenna dipped in the ink fountain;

means for obtaining dielectric constant information associated with the type of ink in the ink fountain;

means for applying a bias to the oscillator based on the obtained dielectric constant information of the ink, wherein said means for obtaining measures the dielectric constant of the ink.

3. An ink level sensor configured to detect an amount of ink in an ink fountain of a printer, comprising:

an oscillator coupled to an antenna and configured to sense the amount of ink in the ink fountain based on a change of oscillation frequency of the oscillator when the antenna is dipped in the ink fountain; and a circuit configured to apply a bias to the oscillator based on dielectric constant information of the ink associated with the type of ink in the ink fountain, wherein the dielectric constant information is obtained by measuring the dielectric constant of the ink.

* * * * *